Figure 1:
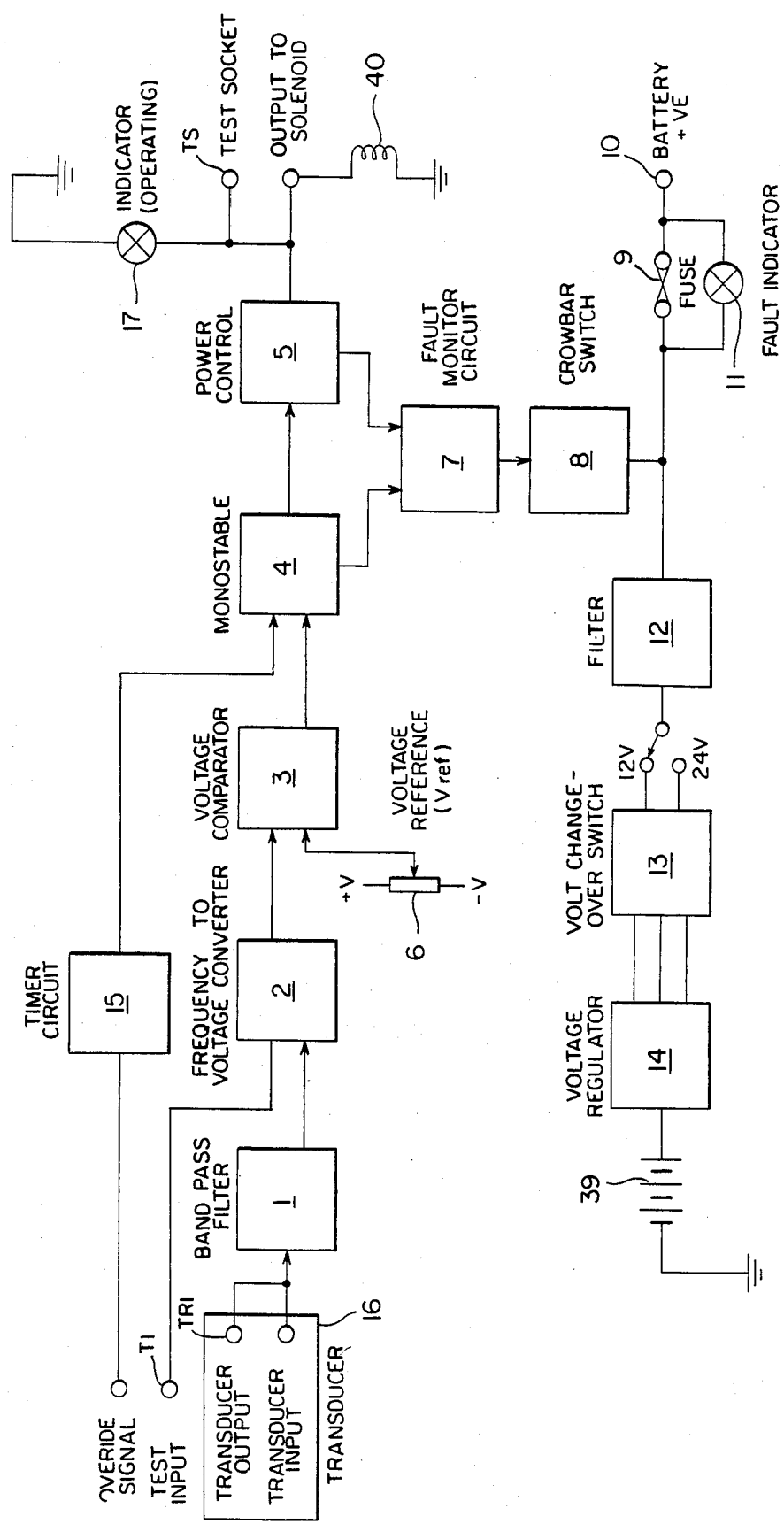

United States Patent [19]

Nield

[11] Patent Number: 4,786,868
[45] Date of Patent: Nov. 22, 1988

[54] SPEED CONTROL UNIT
[75] Inventor: Eric L. Nield, Stalybridge, England
[73] Assignee: Romatic Limited, Saltford, England
[21] Appl. No.: 904,120
[22] Filed: Sep. 5, 1986
[30] Foreign Application Priority Data Sep. 7, 1985 [GB] United Kingdom ............... 8522274

[51] Int. Cl.⁴ .............................................. G01P 3/56
[52] U.S. Cl. ................................... 324/161; 324/163; 324/166
[58] Field of Search ............... 324/160, 161, 163, 166, 324/173; 340/658; 73/2; 180/179; 361/239, 240

[56] References Cited

U.S. PATENT DOCUMENTS

| 3,340,951 | 9/1967 | Vitt | 324/161 |
| 4,166,977 | 9/1979 | Glauert et al. | 324/173 |
| 4,366,373 | 12/1982 | Metcalf | 324/160 |
| 4,570,110 | 2/1986 | Bloom et al. | 318/313 |
| 4,597,465 | 7/1986 | Burney | 180/179 |

FOREIGN PATENT DOCUMENTS 2501297 7/1975 Fed. Rep. of Germany ...... 324/161

Primary Examiner—Reinhard J. Eisenzopf
Assistant Examiner—Anthony L. Miele
Attorney, Agent, or Firm—Fleit, Jacobson, Cohn & Price

[57] ABSTRACT

A speed control system comprises a speed control unit and a test unit. The control unit has a Hall effect transducer for producing a signal representative of vehicle speed and a comparator for comparing that signal with a voltage reference source from which a control signal may be produced to control the vehicle throttle in the event of a disparity so as to maintain vehicle speed at a preset limit. The test unit is employed to set the voltage reference source.

11 Claims, 4 Drawing Sheets

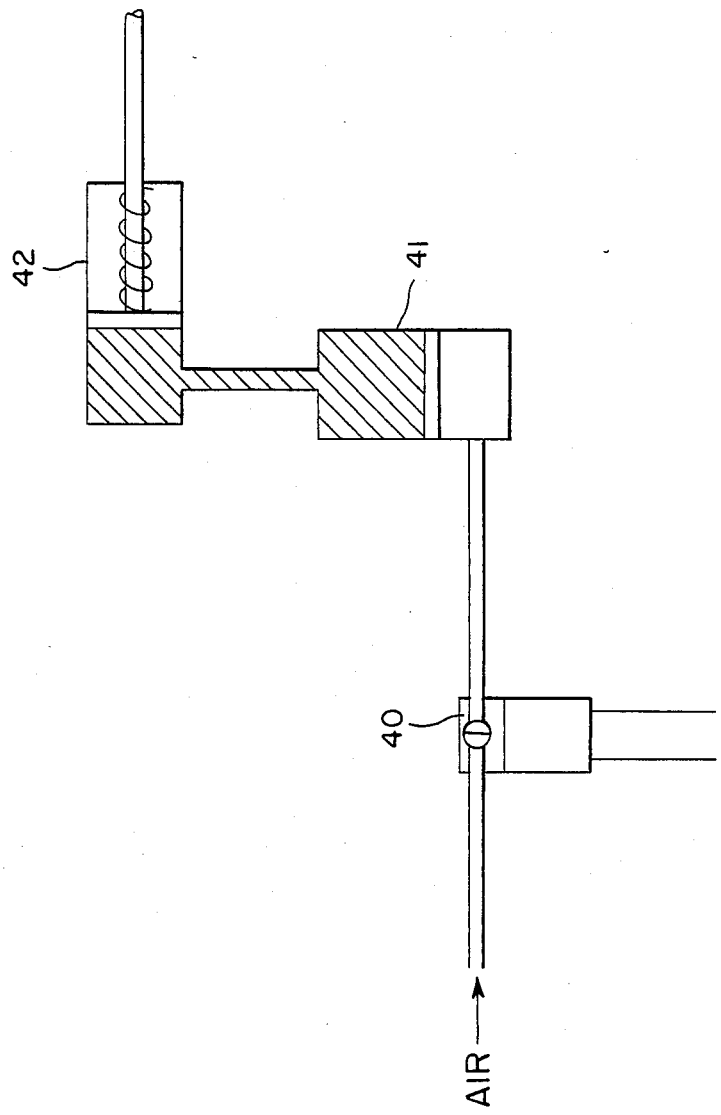

SPEED CONTROL UNIT

The present invention relates to a speed control unit, particularly but not exclusively for vehicles and to a test unit for such a speed control unit.

Such speed control units are already known and operate satisfactorily. However, they are difficult to set particularly for higher speeds. Also once installed in the vehicle, satisfactory operation is difficult to check. Further, it is possible for the unit to malfunction and interfere with the operation of the vehicle in an undesirable way.

According to one aspect of the present invention, there is provided a test unit for a speed control unit comprising means for generating a signal of a given fixed frequency, means for generating a signal of a variable frequency, a frequency counter for measuring the frequency of the signal from either of the signal generating means and a display for displaying frequency measurement whereby the frequency of an input signal from a speed sensor can be measured by comparison with reference to the fixed frequency and by appropriate adjustment of the variable frequency, a calibration frequency is displayed which may be altered by a factor to represent the selected control speed directly on the display in terms of a test frequency input to the speed control unit.

In a preferred embodiment of the invention, a voltage reference input to a voltage comparator is calibrated against the test frequency input from the test unit. In operation the output from the comparator is fed via a monostable and power control to a solenoid which controls the throttle of a vehicle whose speed is to be controlled. A fault monitoring circuit monitors the operation and overrides the control circuit in the event of a fault. A time duration dependant override of the control is also provided for. Indicators, which advantageously are L.E.D.s, are provided to indicate a fault condition and when the voltage reference source or sources has been correctly adjusted.

Figure 2:
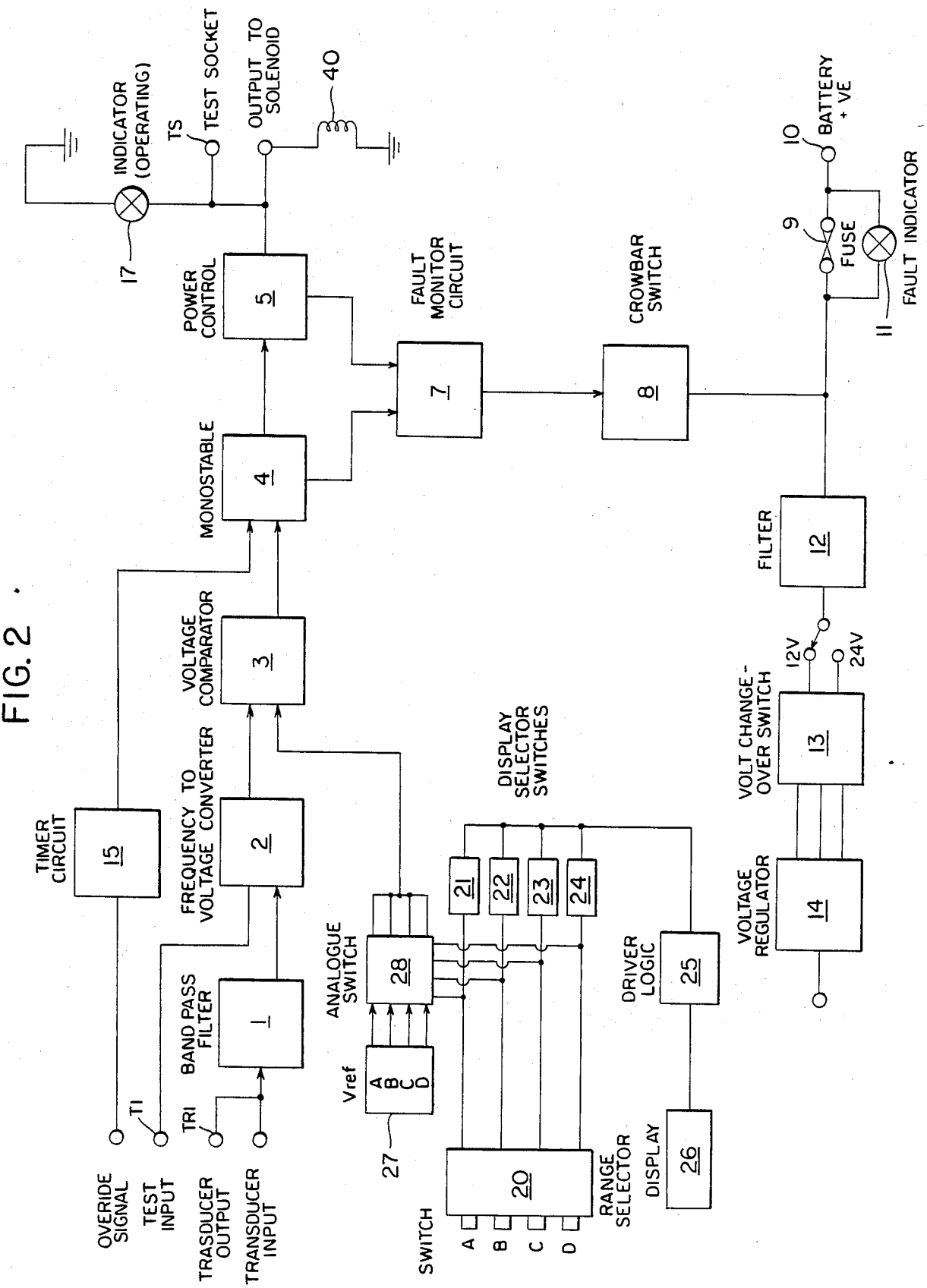
Figure 3:
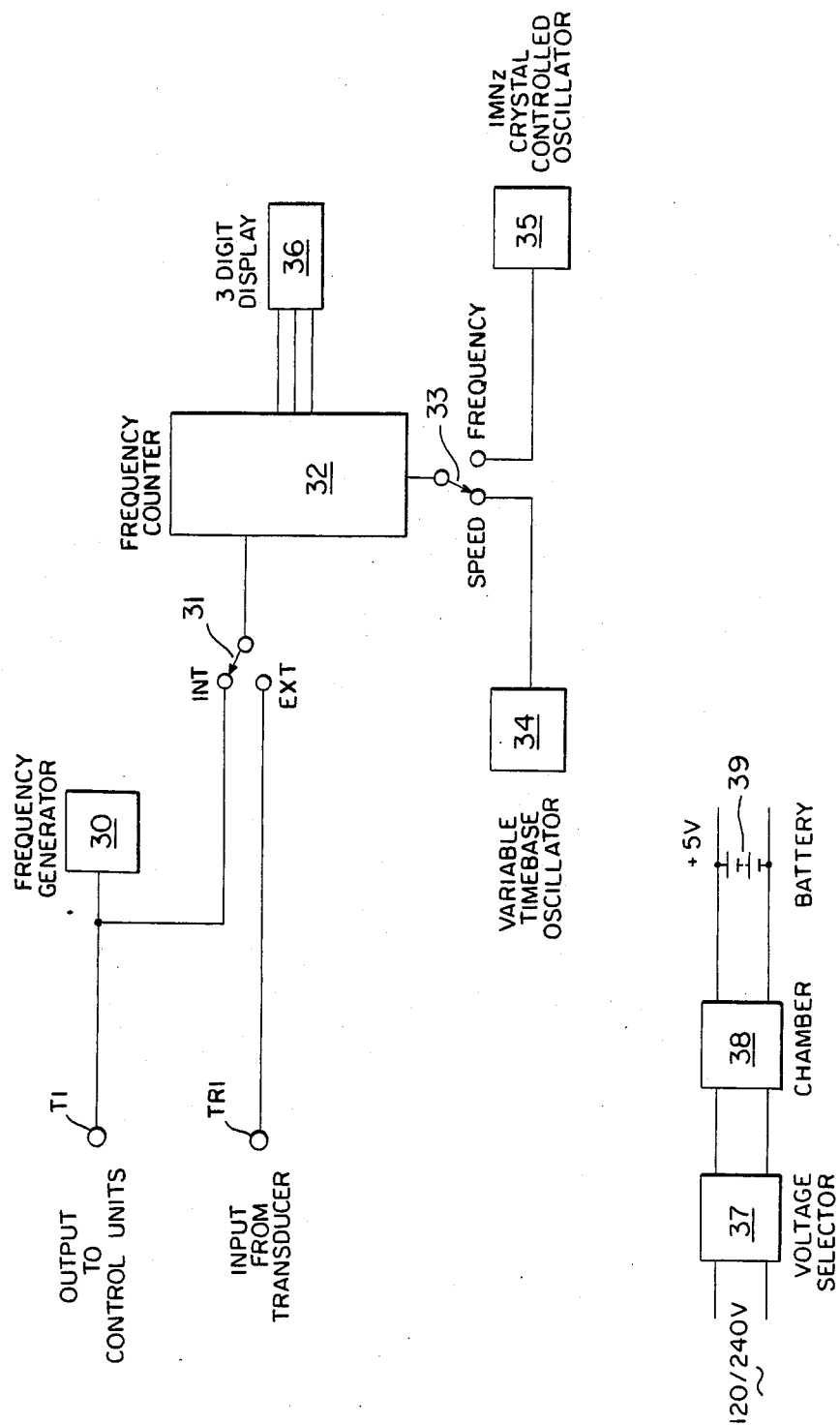

In order that the invention may be more clearly understood, several embodiments of the invention will now be described, by way of example, with reference to the accompanying drawings, in which:

FIG. 1 is a block circuit diagram of one form of speed control circuit for a vehicle, FIG. 2 is a block circuit diagram of another form of speed control circuit for a vehicle which provides for multiple speed settings, FIG. 3 is a block circuit diagram of a test unit for the speed control circuits of FIGS. 1 and 2, and FIG. 4 is a diagram of throttle control on a speed controlled vehicle.

Referring to FIG. 1, the circuit into which, in use, a pulse waveform generated by a Hall effect transducer 16 fitted to a gearbox of the vehicle is injected comprises a bandpass filter 1, frequency to voltage converter 2, voltage comparator 3, monostable 4, and power control 5. A potentiometer 6 provides a voltage reference source for one input of the voltage comparator and a fault monitoring circuit 7 is connected to the monostable 4 and power control 5 and through a "crowbar" switch 8 and fuse 9 to the positive terminal 10 of the battery 39 of the vehicle to which the circuit is connected. A fault indicator 11, which may be a light emitting diode or other appropriate element, is connected across the fuse 9. The battery is also connected through a filter 12 and 12/24 volt changeover switch 13 to a voltage regulator 14 which is operative to supply the various parts of the circuit with power supply at the appropriate voltage. A time circuit 15 is provided for controlling the application of an override signal to monostable 4. A further indicator 17, which may also be a light emitting diode or other appropriate element, is connected to the output of power control circuit 5. The output from circuit 5 is fed to a solenoid 40 which in turn controls operation of the vehicle throttle.

The circuit of FIG. 2 is similar to the circuit of FIG. 1 (equivalent parts bear the same reference numerals). As compared with the arrangement of FIG. 1, however, provision is made for speed control at four separate speeds. To this end, a range selector 20 having four switches A, B, C and D, four display selector switches 21 to 24 corresponding respectively to switches A to D and driver logic 25 and a digital display are provided. The range selector 20 and display switches 21 to 24 are connected to a voltage reference source 27 which is operative to provide reference voltages corresponding to speeds selected by switches A, B, C and D. This source is connected through an analogue switch 28 to one input of comparator 3 as in the embodiment of FIG. 1.

Referring to FIG. 3, the test unit circuit comprises a frequency counter 32 which may be connected in operation through a changeover switch 31 to a frequency generator 30 or to the Hall effect transducer. The calibration input of counter 32 may also be connected through a further changeover switch 33 to a variable time oscillator 34 or a 1 MHz crystal controlled oscillator 35. The frequency counter is also connected to a 3 digit display 36. The unit power supply comprises a 120/240 volt voltage selector 37, a battery charger 38 and a nickel cadmium rechargeable battery 39.

Referring to FIG. 4, the solenoid, referenced 40, controls the operation of the vehicle throttle by controlling flow of air from the vehicle air system to a hydraulic piston and cylinder device 41. This latter device operates a spring loaded piston 42 which is connected to the throttle. If the solenoid is actuated the throttle begins to close and vice versa.

The setting up of the test unit and of the circuit of FIG. 1 will now be described. The vehicle to which the speed control circuit is fitted is driven at a low speed, conveniently on a rolling road, say 20 mph. The frequency of the pulse waveform (say 40 Hz) generated by the Hall effect transducer 16, which is proportional to the speed of the vehicle is measured by comparison with the output of oscillator 35 connected to the calibration input of frequency counter 32 as shown in FIG. 3. Switch 31 connects the output of transducer 16 to counter 32 for this purpose and is then switched over to connect generator 30 to the counter 32. A frequency count (shown on display 36) is then measured by counter 32 independently of transducer 16 by adjusting generator 30 which is the same as that generated by the transducer for the 20 mph speed, that is 40 Hz. Switch 33 is then switched over to disconnect oscillator 35 from and connect oscillator 34 to the calibration input of frequency counter 32. Oscillator 34 is then adjusted to give a calibration reading of 20 mph on display 36 while the generator 30 is generating the 40 Hz frequency. The unit is now calibrated to that particular vehicle. To set up the speed control circuit for a selected vehicle speed of say 60 mph, the generator 30 is adjusted to give a test signal at a frequency equivalent to that speed equal to the product of a selected adjustment factor and the calibrated frequency measurement (that is 3×40 Hz=120 Hz). Such test signal at the selected speed frequency is injected into the speed control circuit through the test input socket referenced TI on FIG. 1. The voltage reference source 6 is adjusted for zero output from the voltage comparator which is indicated by the indicator switching between off and on. The circuit is then set.

In normal operation of the circuit, the waveform from the Hall effect transducer 16 is fed into the circuit via the transducer input socket TRI. Bandpass filter 1 eliminates unwanted frequencies so that illegal signals do not interfere with the operation of the system. The clear signal is passed through the frequency to voltage converter 2 producing a d.c. voltage proportional to the frequency and hence the vehicle speed. This d.c. voltage is compared with the reference voltage Vref such that when Vref is exceeded a signal is output from the comparator 3 to a monostable circuit 4. The purpose of the monostable is to provide a pulse long enough to operate an external solenoid. Thus if the comparator output is just a pulse, the solenoid will operate correctly. If the comparator output is continuous the monostable output will remain. operated. The power control converts the monostable output to a sufficient power to operate the solenoid. L.E.D. indicator 17 illuminates when the solenoid is activated.

During operation the fault monitoring circuit 7 checks that the signal at the solenoid output is correct with the signal from the control circuit 5. If these are not compatable a serious operational fault could result causing vehicle failure. The fault monitoring circuit checks for this condition, and should it occur operates a crowbar circuit, rupturing the main supply fuse 9 and illuminating the fault L.E.D. 11. With no supply to the circuit, the vehicle reverts to normal operation. Each time the vehicle ignition is on the L.E.D. will give a permanent indication of fuse failure.

A test socket TS is provided to allow test and calibration using the test unit of FIG. 3. The ability to monitor and measure the incoming frequency allows calibration of road speed versus frequency. Also a frequency generated by speed and thus calibrate the unit whilst stationary for display on the test unit.

The setting up and operation of the circuit of FIG. 2 is similar to that of the circuit of FIG. 1 for each of the speeds provided for. As described above, the speed at which the system operates is determined by the reference voltage fed to the comparator 3. In the case of FIG. 1 this is provided by potentiometer 6. In the case of FIG. 3, this is provided by one of four potentiometers selected by pushing the appropriate one of buttons A to D of range selector 20. These potentiometers are calibrated as described previously. Each display selector switch 21 to 24 comprises two rotary switches which may be adjusted to give a desired speed reading up to 99. Display 26 displays the speed currently selected.

The override facility is incorporated to allow an immediate change to non-speed limited operation. When operated from an external switch timing circuit 15 is initiated which inhibits the solenoid signal for predetermined time. The digital speed display 26 (in the case of the circuit of FIG. 3) retains its current setting but flashes to signify the override condition. After the time period the system reverts to the condition prior to the override command.

It will be appreciated that the above embodiments have been described by way of example only and that many variations are possible without departing from the scope of the invention. For example, the throttle could be operated electrically if desired.

I claim:

1. In combination with a vehicle speed measuring sensor and speed setting control means connected thereto for limiting vehicle travel to a pre-selected speed, calibrating means connected to the speed setting control means comprising: a frequency counter having a calibration input, oscillator means for generating a fixed frequency signal, switch means selectively connecting the sensor and the oscillator means to the frequency counter for measurement of sensor frequency corresponding to a vehicle speed signal from the sensor during vehicle travel below said pre-selected speed while the fixed frequency signal is applied to the calibration input, display means connected to the frequency counter for displaying said sensor frequency relative to the fixed frequency, adjusting means connected to the oscillator means and the frequency counter for producing a calibration frequency as a function of the displayed sensor frequency corresponding to a desired readout independently of the sensor and test signal means being connected to the speed setting control means for transmitting thereto a test signal at the calibration frequency corresponding said independent desired readout.

2. In combination with a vehicle speed measuring sensor (16) and a speed control circuit to which the sensor is connected for establishing a selected vehicle speed, means connected to the speed control circuit for calibration thereof during travel of the vehicle at a predetermined speed lower than said selected vehicle speed, including: a pair of signal generators (34, 35) respectively generating signals at a fixed frequency and a variable frequency, a frequency counter (32) having a calibration input, means (33) for selectively connecting either one of the signal generators to the calibration input of the frequency counter, means (31) selectively connecting said sensor to the frequency counter for measurement of signal frequency at said predetermined speed simultaneously with said fixed frequency of the signal generated by one of the signal generators (35) being selectively connected to said calibration input, display means (36) coupled to the frequency counter for displaying said signal frequency of the sensor at said predetermined speed relative to said fixed frequency, means for adjusting the variable frequency of the other of the signal generators (34) while connected to the frequency counter independently of the sensor to produce a calibration frequency as a function of the displayed signal frequency corresponding to a desired readout related to the selected vehicle speed and frequency adjustable means (30) being connected to the speed control circuit for transmitting thereto a test signal at said calibration frequency corresponding to the desired readout.

3. The combination of claim 2 wherein the speed control circuit includes means enabling the calibration thereof at said predetermined speed permitting setting thereof at the higher selected vehicle speed.

4. The combination of claim 3, in which the enabling means comprises an adjustable reference source.

5. The combination of claim 4, wherein the speed control circuit further includes a comparator having one input connected to the reference source and another input operatively connected to said frequency adjustable means for producing a signal representative of the vehicle speed.

6. The combination of claim 5, in which the sensor includes a Hall effect transducer.

7. The combination of claim 6, in which the speed control circuit further includes a bandpass filter connected to the transducer, a frequency to voltage converter connected to the filter, a voltage comparator connected to the reference source and the converter, a monostable connected to the comparator and a power control connected to the monostable.

8. The combination of claim 3, wherein the speed control circuit includes a fault monitoring device.

9. The combination of claim 7, including time override means connected to the monostable for overriding the output from the monostable to the power control.

10. The combination of claim 7, including solenoid means connected to the power control for controlling vehicle throttle operation.

11. The combination of claim 3, wherein the speed control circuit further includes range selector means for speed control at a plurality of separate speeds.

* * * * *